(12) United States Patent
Tohyama et al.

(10) Patent No.: US 6,744,399 B2
(45) Date of Patent: Jun. 1, 2004

(54) RADAR APPARATUS IN WHICH THE DIRECTION OF THE ANTENNA IS RECOGNIZABLE FROM OUTSIDE

(75) Inventors: Yukio Tohyama, Kobe (JP); Ritsu Katsuoka, Kobe (JP); Tsuguhisa Ishii, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 0 days.

(21) Appl. No.: 10/374,823

(22) Filed: Feb. 25, 2003

(65) Prior Publication Data

US 2003/0184471 A1 Oct. 2, 2003

(30) Foreign Application Priority Data

Feb. 27, 2002 (JP) ........................................ 2002-052028

(51) Int. Cl.$^7$ ................................................ G01S 7/40
(52) U.S. Cl. ........................ 342/165; 342/174; 342/70; 343/872
(58) Field of Search .............................. 342/70, 71, 72, 342/74, 75, 77, 81, 82, 84, 85, 89, 118, 165, 173, 174, 175; 343/872, 873, 878, 887, 892; 180/167

(56) References Cited

U.S. PATENT DOCUMENTS

| | | | | |
|---|---|---|---|---|
| 4,346,774 A | * | 8/1982 | Hirota et al. | 180/167 |
| 6,020,844 A | * | 2/2000 | Bai et al. | 342/165 |
| 6,025,796 A | * | 2/2000 | Crosby, II | 342/70 |
| 6,215,438 B1 | * | 4/2001 | Oswald et al. | 342/70 |
| 6,469,659 B1 | * | 10/2002 | Lajiness et al. | 342/173 |
| 2001/0026237 A1 | * | 10/2001 | Okai et al. | 342/70 |
| 2002/0163463 A1 | * | 11/2002 | Lajiness et al. | 342/70 |
| 2003/0184471 A1 | * | 10/2003 | Toyhama et al. | 342/175 |

FOREIGN PATENT DOCUMENTS

JP      11-326495      11/1999

OTHER PUBLICATIONS

"Compact multibeam imaging antenna for automotive radars", Schoenlinner,B.; Rebeiz, G.M.;Microwave Symposium Digest, 2002 IEEE MTT–S Int'l, vol.: 2, Jun. 2–7, 2002 Ps:1373–1376.*

"System requirements for automotive radar antennas", Hoare, E.G.; Hill, R.;Antennas for Automotives (Ref. No. 2000/002), IEE Colloquium on, Mar. 10, 2000 pp.: 1/1–111.*

Patent Abstract of Japan, Publictaion No. 11–326495, Published on Nov. 26, 1999, in the name of Hitachi Ltd., et al.

* cited by examiner

*Primary Examiner*—John B. Sotomayor
(74) *Attorney, Agent, or Firm*—Christie, Parker & Hale, LLP

(57) ABSTRACT

A radar apparatus is provided in which an antenna axis and vehicle axis can agree with each other even when the antenna face is covered with a cover. In an assembling process of the radar apparatus composed of a chassis, an antenna incorporated in the chassis and a cover attached to the chassis to cover the antenna, a correlative positional relation between an antenna axis of the antenna incorporated into the chassis and one portion of the chassis or bracket is detected, and the thus detected data is inscribed on a seal and the seal is stuck to the chassis or the data is stored in an internal memory, and the chassis into which the antenna is incorporated is covered with the cover, so that the radar apparatus is manufactured. When this radar apparatus is attached to a vehicle, the antenna axis can be adjusted parallel to the vehicle axis by utilizing data of a correlative positional relation between the antenna and one portion of the chassis or bracket.

39 Claims, 12 Drawing Sheets

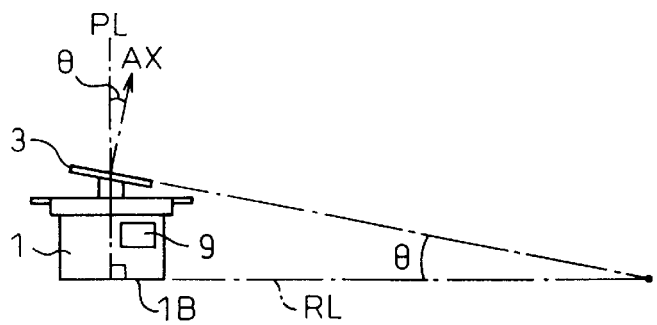
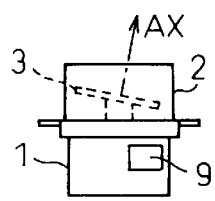
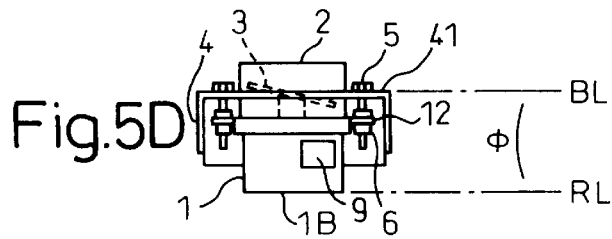
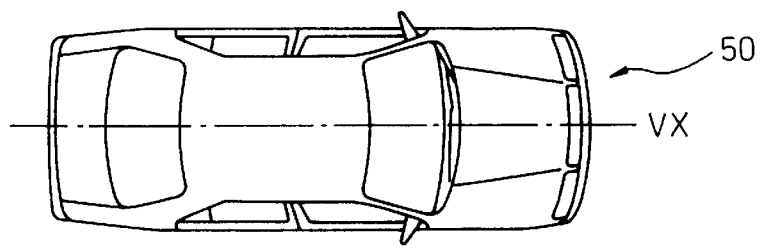
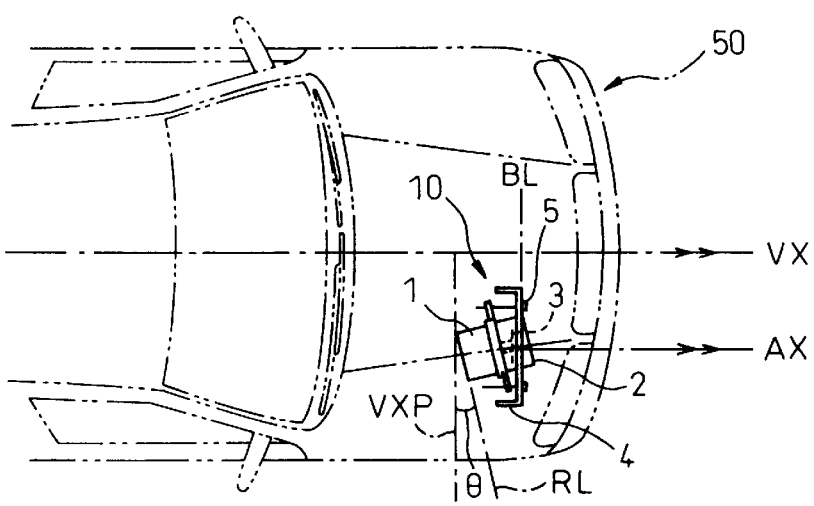

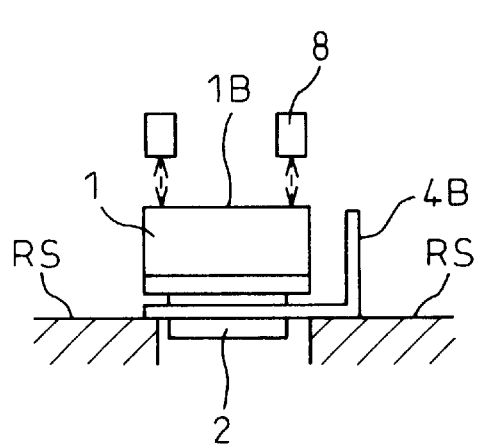
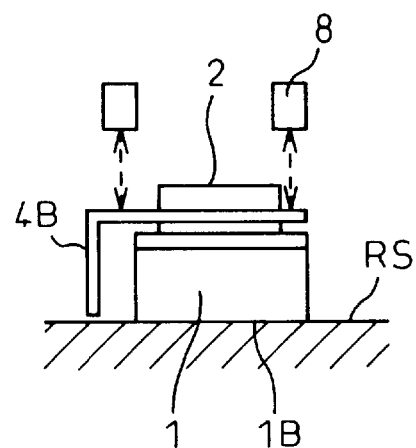
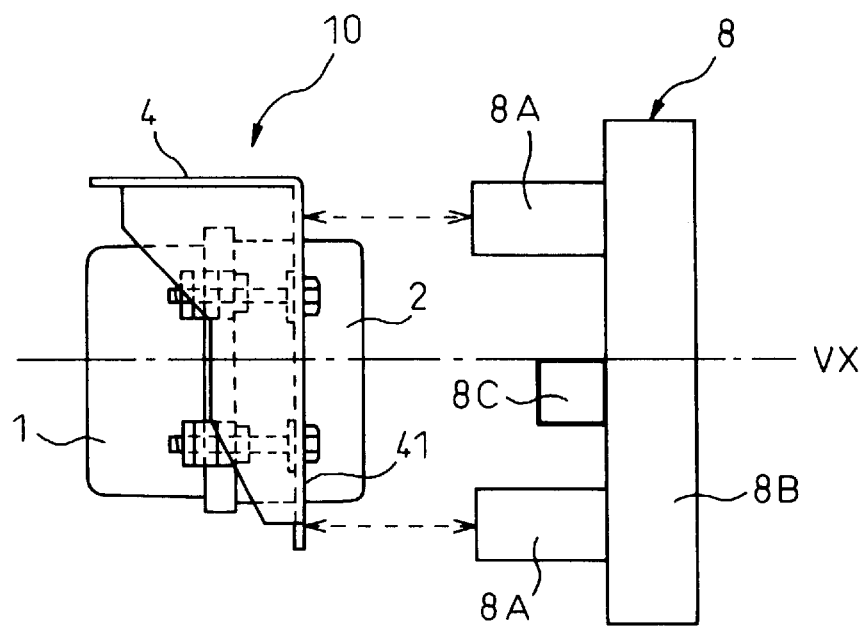

RADAR APPARATUS IN WHICH THE DIRECTION OF THE ANTENNA IS RECOGNIZABLE FROM OUTSIDE

CROSS-REFERENCE TO RELATED APPLICATION

This application claims priority from, and incorporates by reference the entire disclosure of, Japanese Patent Application No. 2002-052028 filed on Feb. 27, 2002.

BACKGROUND OF THE INVENTION

1. Field of the Invention

The present invention relates to a radar apparatus in which the direction of the antenna is recognizable from outside. More particularly, the present invention relates to a radar apparatus in which the direction of the antenna is recognizable from outside, is capable of easily adjusting the direction of the antenna to the vehicle axis even when the antenna face is covered with a protective member and cannot be seen from outside.

2. Description of the Related Art

In order to prevent the occurrence of a traffic accident in which a vehicle running ahead and one running behind crash into each other, a system for indicating the distance between two vehicles has been recently put into practical use. A radar apparatus to be mounted on a vehicle has been developed so that it can be used as a range finder to determine the distance between two vehicles which is used for a warning system. The measuring accuracy of the radar apparatus to be mounted on a vehicle must be high. Therefore, an axis perpendicular to the antenna face, which determines an electric wave irradiating face of the antenna of the radar apparatus, must be accurately adjusted to the central axis (vehicle axis) of the vehicle which is the running direction of the vehicle. This perpendicular axis perpendicular to the antenna face, that is, the central axis of the electric waves transmitted from or received by the antenna will be referred to as an antenna axis, in this specification, hereinafter.

In order to make the antenna axis agree with the vehicle axis when the radar apparatus is attached to a vehicle, it is common to adopt a method in which an irradiating angle of electric waves emitted from the radar apparatus is measured and the thus measured irradiating angle is adjusted so that it becomes parallel with the vehicle axis. According to this method, when the antenna face is mechanically adjusted so that it becomes perpendicular to the vehicle axis, the adjusting time to adjust the antenna axis can be reduced. For example, according to Japanese Unexamined Patent Publication No. 11-326495, after the radar apparatus is mounted on a vehicle, while the antenna face is being exposed or the antenna face is being correlated with an attaching position of the cover face, an inclination of the antenna is measured, and an axis adjusting bolt of the bracket for adjusting the antenna axis is adjusted so that the antenna axis becomes parallel with the vehicle axis which has already been measured.

However, the following problems may be encountered in the conventional antenna axis adjusting method disclosed in Japanese Unexamined Patent Publication No. 11-326495.

(1) In the case where the antenna or the inside of the radar apparatus is exposed, there is a possibility that the radar apparatus is damaged when the radar apparatus is mounted on a vehicle before measurement. Further, in order to prevent the radar apparatus from being damaged, it is necessary to provide a protective cover, which increases the time and labor in the manufacturing process of the radar apparatus.

(2) The antenna cover of the radar apparatus is provided for not only the protection of the inside but also the function of air-tightness. Therefore, when the method is adopted in which the cover is detached and the antenna axis is adjusted, it is difficult to guarantee the air-tightness of the radar apparatus as a product when the cover is attached after the antenna axis has been adjusted.

(3) When the method is adopted in which an inclination of the antenna face is measured while the antenna face is being correlated to the attaching position of the cover face, from the viewpoint of reducing the manufacturing cost and enhancing the productivity, it is difficult to assemble the radar apparatus to a vehicle so that the antenna face can be correlated to the attaching position of the cover face.

SUMMARY OF THE INVENTION

The present invention has been accomplished to solve the above problems caused in the antenna axis adjusting method of the conventional radar apparatus. It is an object of the present invention to provide a radar apparatus in which the direction of the antenna is recognizable from outside characterized in that even when the antenna face is covered with a cover so that it is shut off from outside, the direction of the antenna can be recognized from outside and the antenna axis and the vehicle axis can be easily made to agree with each other.

According to the present invention, in the case of mounting the radar apparatus on a vehicle which is covered with a cover in the assembling process so that it is impossible to determine the direction of the antenna axis from outside, a correlative positional relation between the antenna axis and one portion of the chassis of the radar apparatus, or a correlative positional relation between the antenna axis and one portion of the bracket, to which the radar apparatus is attached, has already been detected in the assembling process, and it is possible to know this correlative positional relation from outside. Accordingly, even when a worker cannot see the antenna face because it is covered with a cover in the case of mounting the radar apparatus on the vehicle, it is easy for the worker to adjust the antenna axis to the vehicle axis.

To explain briefly, the present invention provides a radar apparatus in which the direction of the antenna is recognizable from outside comprising: a chassis having a space therein in which at least an antenna is accommodated; an antenna incorporated to the chassis; and a cover which covers the antenna and is attached to the chassis, wherein a correlative positional relation between the antenna axis of the antenna and one portion of the chassis is measured before the chassis is covered with a cover, and the measured value is printed on a seal and the seal is stuck on the radar apparatus. Alternatively, the measured value is stored in the internal memory, and even when the antenna can not be seen from outside because the chassis is covered with the cover, it is possible to recognize the measured value from outside of the radar apparatus, that is, a state of the antenna axis to one portion of the chassis can be confirmed from outside.

In the case where the radar apparatus is mounted on a vehicle by using a bracket, before the chassis is covered with the cover, at least one of the measured values of the correlative positional relation between the antenna and one portion of the chassis, the correlative positional relation between the antenna axis and one portion of the bracket and the correlative positional relation between one portion of the chassis and one portion of the bracket is measured, and this measured value is printed on a seal and the seal is stuck to the radar apparatus or stored in the internal memory, and even when the antenna can not be seen from outside because the chassis is covered with the cover, it is possible to recognize the measured value from outside of the radar apparatus, that is, a state of the antenna axis to one portion of the bracket or a state of the antenna axis to one portion of the chassis, can be confirmed from outside.

of course, a correlative positional relation between the antenna axis and one portion of the chassis, a correlative positional relation between the antenna axis and one portion of the bracket and a correlative positional relation between one portion of the chassis and one portion of the bracket can be measured by various methods.

In the case where the radar apparatus of the present invention is mounted on a vehicle, the vehicle axis of the vehicle is previously measured and, with respect to this vehicle axis, while the antenna axis is being adjusted so that it becomes parallel with the vehicle axis according to any of the measured values of the correlative positional relation between the antenna axis and one portion of the chassis, the correlative positional relation between the antenna axis and one portion of the bracket and the correlative positional relation between one portion of the chassis and one portion of the bracket, the radar apparatus may be mounted on the vehicle.

BRIEF DESCRIPTION OF THE DRAWINGS

The present invention is illustrated by way of examples, and not limitation, in the figures of the accompanying drawings in which like reference numerals indicate similar elements and in which:

FIG. 5A is a view for explaining the first step of the antenna axis adjusting method of the second embodiment of the radar apparatus of the present invention.

FIG. 5B is a view for explaining the second step of the antenna axis adjusting method of the second embodiment of the radar apparatus of the present invention.

FIG. 5C is a view for explaining the third step of the antenna axis adjusting method of the second embodiment of the radar apparatus of the present invention.

FIG. 5D is a view for explaining the fourth step of the antenna axis adjusting method of the second embodiment of the radar apparatus of the present invention.

FIG. 5E is a view for explaining the fifth to the seventh steps of the antenna axis adjusting method of the second embodiment of the radar apparatus of the present invention.

FIG. 10A is a schematic illustration showing a method of detecting a correlative positional relation between one portion of the chassis and one portion of the bracket while the bracket is being fixed to a reference surface in the case where the chassis of the radar apparatus of the present invention is attached to a vehicle through the bracket.

FIG. 10B is a schematic illustration showing a method of detecting a correlative positional relation between one portion of the chassis and one portion of the bracket while the chassis is being fixed to a reference surface in the case where the chassis of the radar apparatus of the present invention is attached to a vehicle through the bracket.

FIG. 11 is a schematic illustration showing a method of detecting a correlative positional relation between one portion of the bracket and the vehicle axis with a non-contact type displacement sensor in the case where the radar apparatus of the present invention is attached to a vehicle through the bracket.

DESCRIPTION OF THE PREFERRED EMBODIMENTS

By referring to the accompanying drawings, embodiments of the present invention will be specifically explained as follows.

Figure 1A:
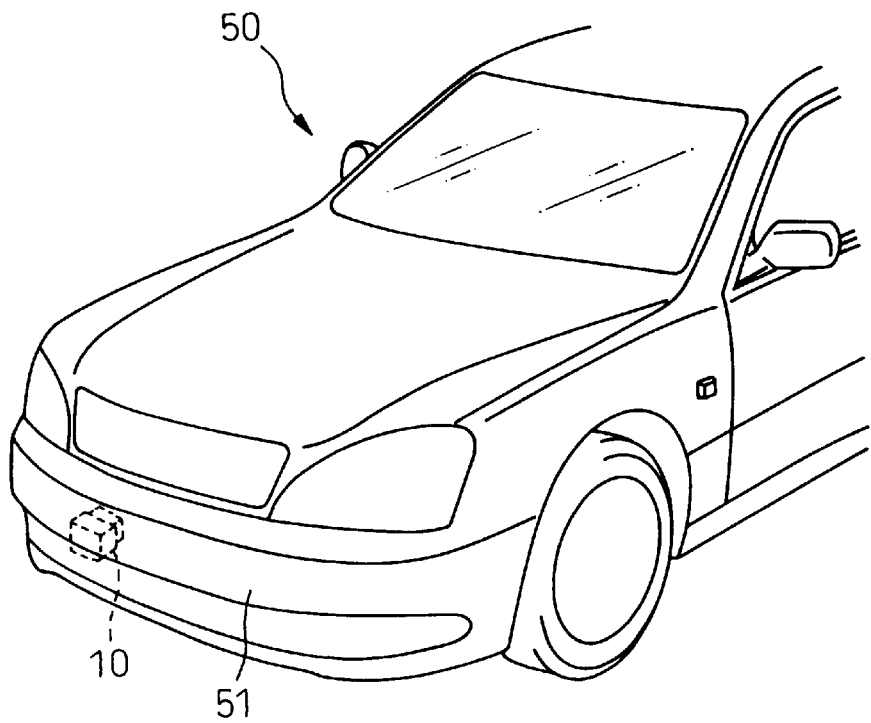
FIG. 1A is a perspective view showing an example of the position at which the radar apparatus of the present invention is mounted on a vehicle.
Figure 1B:
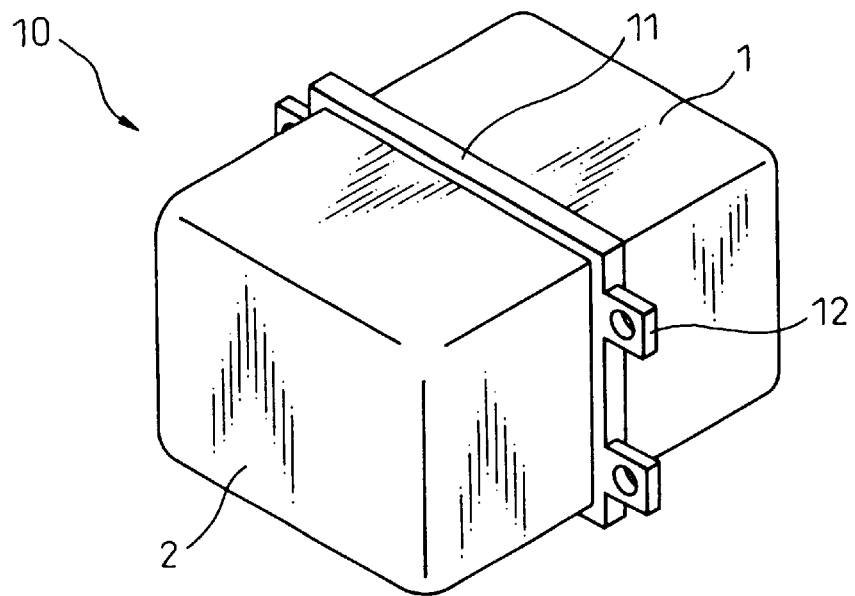
FIG. 1B is a perspective view showing an overall structure of an example of the radar apparatus of the present invention.

FIG. 1A is a view showing a position at which the radar apparatus 10 of the present invention is mounted on the vehicle (automobile) 50. In this example, the radar apparatus 10 of the present invention is mounted at the rear of the front bumper 51 of the vehicle 50. FIG. 1B is a view showing an appearance of the radar apparatus 10 shown in FIG. 1A. The radar apparatus 10 is composed of a chassis 1 and cover 2. In general, the chassis 1 is made of metal by means of casting, and the cover 2 is made of resin. The cover 2 is attached to the connecting section 11, the width of which is extended, of the chassis 1 and tightly sealed so that wind and rain can not get into the chassis 1. In the periphery of the connecting section 11, there are provided attaching pieces 12 through which the radar apparatus 10 is fixed to the vehicle 50. The radar apparatus 10 is directly attached to the vehicle 50 by screws or bolts inserted into these attaching pieces 12. Alternatively, the radar apparatus 10 is attached to the vehicle 50 through a bracket not shown by means of screws (bolts).

Figure 2A:
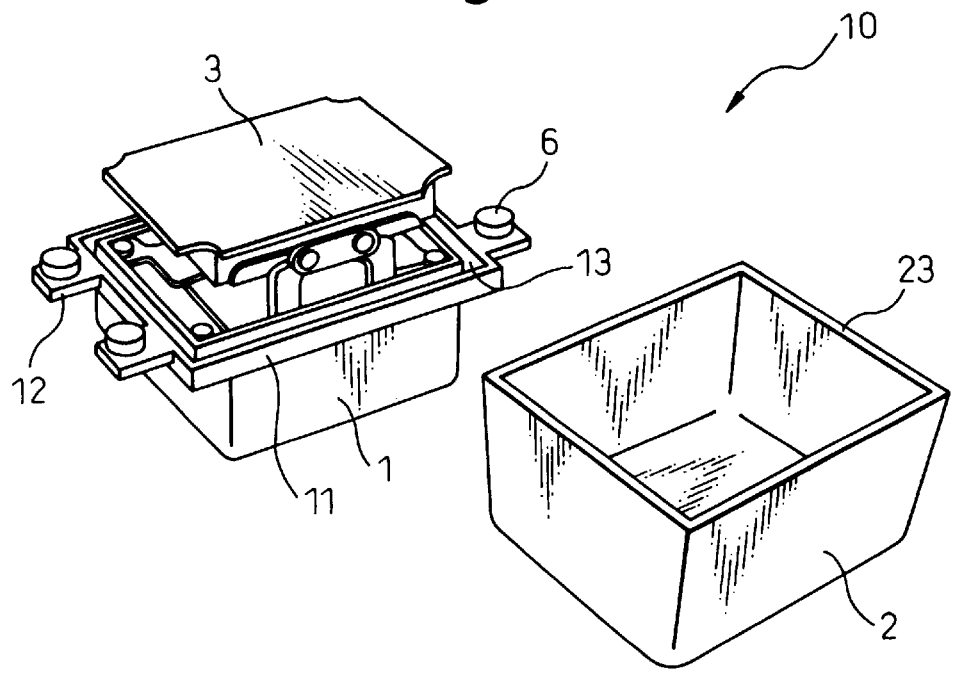
FIG. 2A is a perspective view showing a cover and main body in a state in which the cover is detached from the radar apparatus shown in FIG. 1B.

FIG. 2A is a view showing a state in which the cover 2 is detached from the radar apparatus 10 shown in FIG. 1B. As can be seen in the view, inside the chassis 1, there is provided an antenna 3 for transmitting and receiving electric waves. In the connecting section 11 of the chassis 1 in which the chassis 1 is connected with the cover 2, there is provided a groove section 13. The opening end 23 of the cover 2 is inserted into this groove section 13 so that the cover 2 can be attached to the chassis 1. A portion between the groove section 13 and the cover 2 is sealed by a sealing member not shown in the drawing. As a result, the inside of the chassis is tightly sealed by the cover 2 inserted into the groove section 13.

Figure 2B:
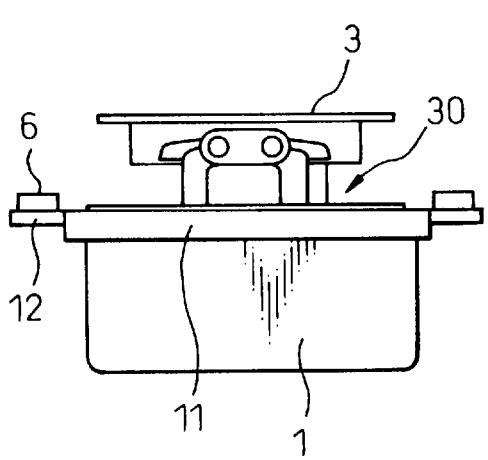
FIG. 2B is a side view showing a main body of the radar apparatus shown in FIG. 2A.
Figure 2C:
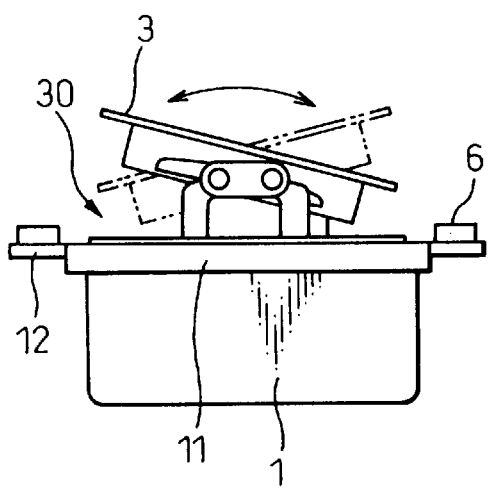
FIG. 2C is a view showing a movable range of the antenna in the case where the antenna of the radar apparatus shown in FIG. 2B is of the movable type.

FIG. 2B is a side view of the chassis 1 shown in FIG. 2A. In the chassis 1, there is provided a drive mechanism 30 for driving the antenna 3 which is capable of oscillating the antenna 3 to the right and left as shown in FIG. 2C, although the detailed mechanism is not shown in the drawing and detailed explanations are omitted here. The antenna 3 can be oscillated by the drive mechanism 30 between the position indicated by the solid line and the position indicated by the broken line in FIG. 2C.

In this connection, the member represented by reference numeral 6 shown in FIGS. 2A to 2C, which is attached to each attaching piece 12, is a grommet made of elastic material. The function of this grommet 6 will be described later.

FIGS. 3A to 3D are views for explaining the first embodiment of the antenna axis adjusting method of the radar apparatus 10 of the present invention. In the first embodiment, an adjusting method is explained in the case where the chassis 1 of the radar apparatus 10 is directly attached to the vehicle 50. Antenna axis AX is a central axis of electric waves transmitted from or received by the antenna 3 as described before, that is, antenna axis AX is an axis perpendicular to the central portion of the antenna face.

The radar apparatus 10 includes: a chassis 1 explained referring to FIG. 2A; an antenna 3 built in the chassis 1; and a cover 2 for covering the antenna 3, attached to the chassis 1. In the radar apparatus 10 directly attached to the vehicle 50, the parallelism of the antenna axis AX to the vehicle axis VX is adjusted.

Figure 3A:
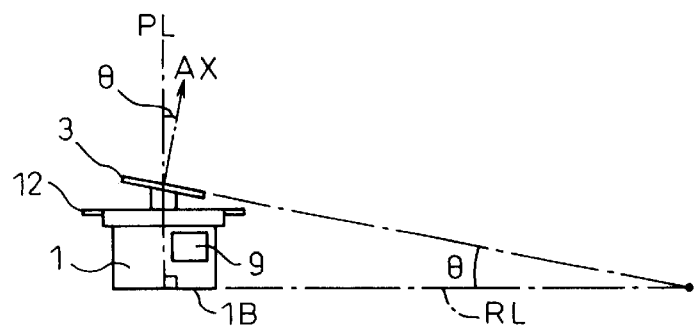
FIG. 3A is a view for explaining the first step of the antenna axis adjusting method of the first embodiment of the radar apparatus of the present invention.

The first step is executed, for example, by a manufacturing company where the radar apparatus 10 is manufactured. As shown in FIG. 3A, in the first step, in the assembling process of the radar apparatus 10, an inclination angle θ formed between the antenna 3, which is built in the chassis 1, and the back face 1B of the chassis 1 is detected by measurement. This inclination angle θ is detected as data representing an inclination angle of the antenna 3 with respect to reference line RL passing on the back face 1B of the chassis 1. When this inclination angle θ of the antenna 3 is detected, it is possible to detect an inclination angle and inclination direction of antenna axis AX with respect to reference line RL passing on the back face 1B of the chassis 1. In other words, in the first step, it is possible to detect a correlative positional relation between antenna axis AX and reference line RL perpendicular to the back face 1B of the chassis 1.

For example, in order to simplify the explanation, suppose that reference line RL is located on the surface of the drawing and that the transmitting and receiving face of the antenna 3 is inclined only in the extending direction of reference line RL. Then, antenna axis AX is inclined by angle θ with respect to straight line PL perpendicular to reference line RL.

The thus detected positional data can be stored in an internal memory in the case where the memory is built into the chassis 1. Further, the thus detected positional data can be printed on the seal 9 in the form of numerals or bar codes, and this seal 9 can be stuck on the side of the chassis 1.

Actually, an inclination of antenna axis AX with respect to straight line PL perpendicular to reference line RL can be represented by the X-axis (vertical direction) and the Y-axis (horizontal direction). For example, in the case where antenna axis AX is inclined in the X-axis direction by +0.1° (mark + indicates the upper direction) and also inclined in the Y-axis direction by +0.2° (mark + indicates the right), it can be expressed by the data of (θX, θY)=(+0.1, +0.2).

Figure 3B:
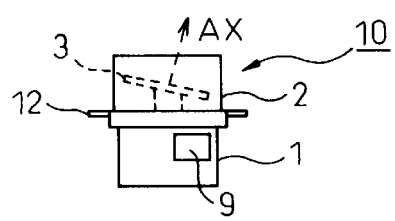
FIG. 3B is a view for explaining the second step of the antenna axis adjusting method of the first embodiment of the radar apparatus of the present invention.

As shown in FIG. 3B, in the second step, the radar apparatus 10 is assembled in such a manner that the chassis 1 into which the antenna 3 is incorporated is tightly sealed by the cover 2. Even when the antenna 3 is tightly sealed into the chassis 1 by the cover 2 and can not be visually seen from outside, in the first embodiment, it is possible to obtain data, in which the inclination (θX, θY) of the antenna axis AX detected in the first step is described, from outside. Therefore, it is possible to know a state of antenna axis AX of the antenna 3 arranged in the chassis 1. The reason why it is possible to know a state of antenna axis AX of the antenna 3 is that, for example, even after a manufacturer of the radar apparatus 10 has completed manufacturing the radar apparatus 10, which is sealed by the cover 2, and shipped it to a vehicle manufacturer, the necessary data can be easily obtained by the vehicle manufacturer.

Figure 3C:
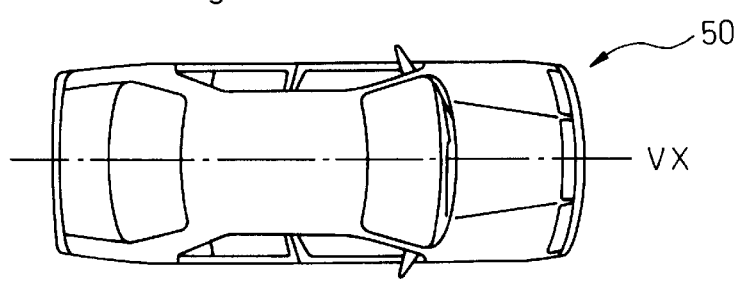
FIG. 3C is a view for explaining the third step of the antenna axis adjusting method of the first embodiment of the radar apparatus of the present invention.

For example, the first and the second step described above are performed by the radar manufacturer that manufactures the radar apparatus 10. On the other hand, for example, the third step described below is performed by the vehicle manufacturer. In the third step, as shown in FIG. 3C, vehicle axis VX of the vehicle 50, to which the radar apparatus 10 is attached, is detected by conducting measurements. Vehicle axis VX is a center line of the vehicle 50 in the longitudinal direction. For example, vehicle axis VX is measured by a tester equipped with a visible light laser.

Figure 3D:
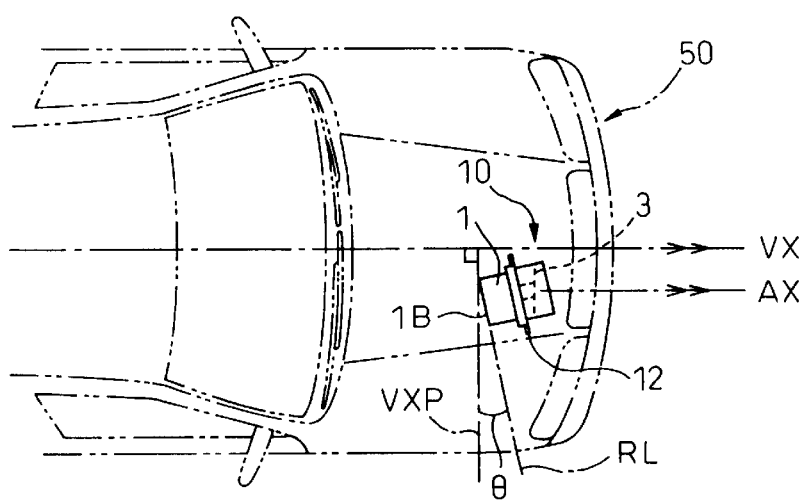
FIG. 3D is a view for explaining a step in which the radar apparatus of the present invention, the antenna axis of which is adjusted in the manner shown in FIGS. 3A to 3C, is fixed to a chassis of a vehicle.

After the first to the third step are completed as described above, a chassis fixing step, in which the radar apparatus 10 is fixed to the vehicle 50, is conducted. In the chassis fixing step, as shown in FIG. 3D, by utilizing the correlative positional relation (θX, θY) between the back face 1B of the chassis 1 detected in the first step and antenna axis AX and also by utilizing the detected vehicle axis VX, a state in which the back face 1B of the chassis 1 is attached to the vehicle 50 is adjusted with respect to vehicle axis VX so that antenna axis AX can become parallel with vehicle axis VX, and the chassis 1 is fixed to the vehicle 50.

In this adjustment, for example, under the condition that reference line RL passing on the back face 1B of the chassis 1 shown in FIG. 3A is maintained horizontal, when the chassis 1 is fixed to the vehicle 50 so that an angle formed between this reference line RL and straight line VXP, which is perpendicular to vehicle axis VX in the horizontal direction, is θ, it is possible to make antenna axis AX of the radar apparatus 10 parallel with vehicle axis VX. In this case, brackets to hold the attaching pieces 12 of the radar apparatus 10 so that the positions can be adjusted are integrally provided in the vehicle 50.

In this connection, all the attaching and adjusting process of the radar apparatus 10 including the adjustment of the antenna axis AX may be conducted on either the radar apparatus manufacturer side or the vehicle manufacturer side.

Figure 4A:
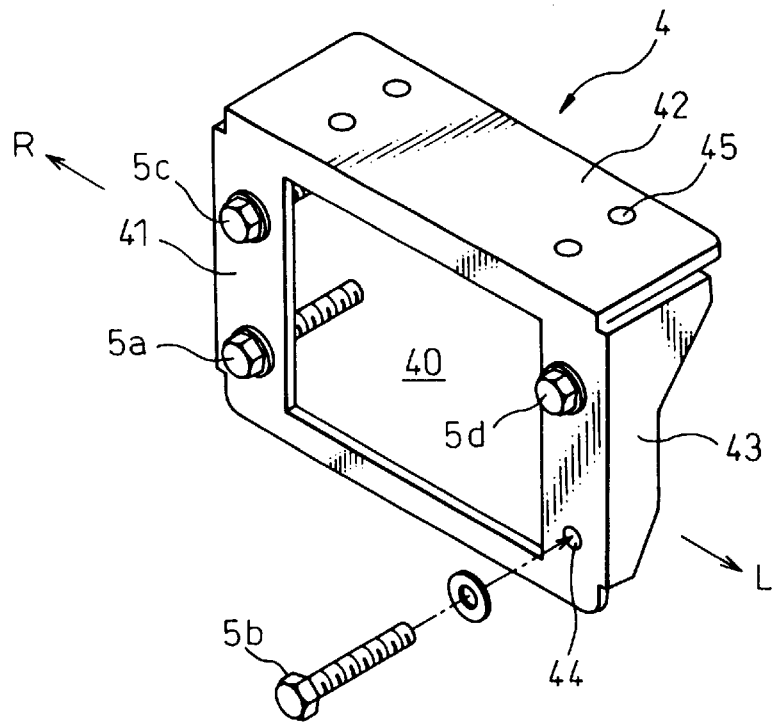
FIG. 4A is a perspective view showing an example of the bracket used in the case where the radar apparatus of the present invention is attached to a vehicle.

FIG. 4A is a view showing an example of the bracket 4 used when the radar apparatus 10 of the present invention is attached to a vehicle. This bracket 4 is used in the second embodiment described later. A main body of this bracket 4 includes: a front face plate 41; an attaching plate 42 attached to a vehicle; and side plate 43. On the front plate 41, there is provided an opening section 40 into which the cover 2 of the radar apparatus 10 is inserted. On both sides of front plate 41, the holes 44 are formed, the number of which is two on each side, into which the chassis attaching position adjusting screws (bolts 5a to 5d in this embodiment) are inserted. In this embodiment, on the attaching plate 42, there are provided four attaching holes 45 into which screws or bolts are inserted so that the bracket 4 can be attached to a predetermined position of the vehicle. In this connection, the attaching plate 42 is attached to a predetermined portion of the vehicle parallel with the ground face. Therefore, when the attaching plate 42 is attached to the vehicle, the attaching plate 42 can be set parallel with the ground face.

Figure 4B:
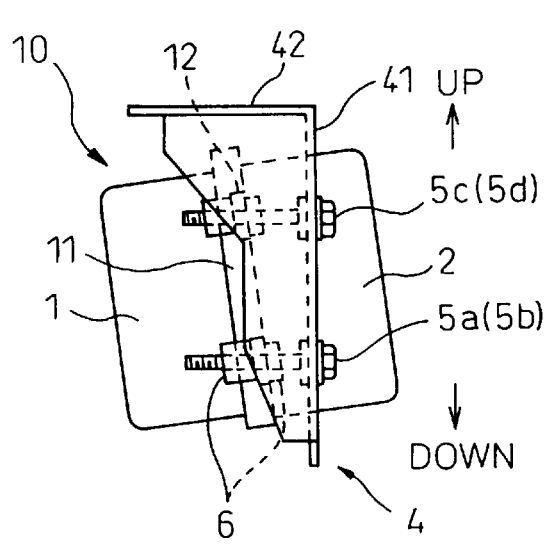
FIG. 4B is a view for explaining an adjustment in the vertical direction of the radar apparatus attached to the bracket shown in FIG. 4A.

FIG. 4B is a side view showing a state in which the radar apparatus 10 is attached to the bracket 4 shown in FIG. 4A. The bolts 5a to 5d inserted into the holes 44 fix the radar apparatus 10 to the bracket 4 while the bolts 5a to 5d are being inserted into two grommets 6 between which the attaching piece 12 protruding from the chassis 1 is interposed. The grommets 6 are deformable elastic bodies. Therefore, each bolt 5a to 5d inserted into the grommet 6 can be fixed by an elastic force of the grommet 6. Each bolt 5a to 5d can be freely rotated in the hole 44. For example, each bolt 5a to 5d is rotated clockwise, the attaching piece 12 is moved in the direction of the head portion of the rotated bolt 5a to 5d, and the radar apparatus 10 is tilted. For example, when the attaching plate 42 shown in FIG. 4B is located on the upper side of the vehicle, the radar apparatus 10 can be tilted upward (Up) by rotating the two bolts 5a, 5b arranged on the lower side clockwise as shown in the drawing. The radar apparatus 10 can be tilted downward (Down) by rotating the two bolts 5a, 5b arranged on the lower side counterclockwise.

Figure 4C:
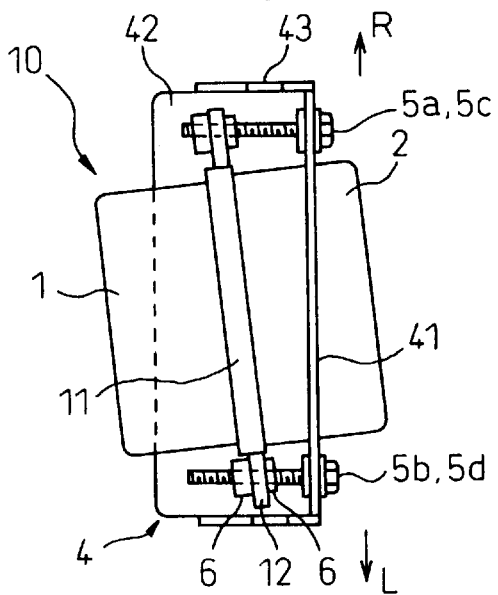
FIG. 4C is a view for explaining an adjustment in the horizontal direction of the radar apparatus attached to the bracket shown in FIG. 4A.

FIG. 4C is a lower face view showing a state in which the radar apparatus 10 is attached to the bracket 4 shown in FIG. 4A. In this state shown in FIG. 4C, when both the bolts 5b and 5d, which are arranged on the right (lower side in FIG. 4C), are turned clockwise, the radar apparatus 10 is directed to the left (the right R with respect to the traveling direction when the view is taken from the vehicle side). When the bracket 4 of this embodiment is used as described above, the direction of the radar apparatus 10 can be freely adjusted under the condition that the radar apparatus 10 is attached to the bracket 4.

In this connection, the direction adjustment of the embodiment described above is only an example, that is, it is possible to consider various examples. For example, in the above embodiment, the number of the adjustment bolts is four, however, the number of the adjustment bolts may be three.

FIGS. 5A to 5E are views for explaining the second embodiment of the method of adjusting the antenna axis of the radar apparatus 10 of the present invention. The adjusting method of the second embodiment is executed in the case where the chassis 1 of the radar apparatus 10 is directly attached to the vehicle 50 by using the bracket 4 explained in FIG. 4.

The first to the third step shown in FIGS. 5A to 5C of the method of adjusting the antenna axis of the radar apparatus 10 of the second embodiment are completely the same as those of the method of adjusting the antenna axis of the radar apparatus 10 of the first embodiment explained referring to FIGS. 3A to 3C. Therefore, like reference characters are used to indicate like parts in the views of FIGS. 3A to 3C and the views of FIGS. 5A to 5C which explain the first to the third step of the method of adjusting the antenna axis of the radar apparatus 10 of the second embodiment. Therefore, the explanations are omitted here.

In the fourth step shown in FIG. 5D, the chassis 1 is attached to the brackets 4 with the bolts 5. In this state, a correlative positional relation between one portion of the chassis 1 and one portion of the bracket 4 is detected. In the embodiment shown in FIG. 5, in the same manner as that of the first embodiment, one portion of the chassis 1 is the back face 1B of the chassis 1, and one portion of the bracket 4 is the front face plate 41 of the bracket 4. In this embodiment, angle $\phi$ formed between the back face 1B of the chassis 1 and the front face plate 41 of the bracket 4 is detected. For example, angle $\phi$ formed between reference line RL passing on the back face 1B of the chassis 1 explained in FIG. 3A and line BL, on which a plane perpendicular to reference line RL crosses the front face plate 41, is detected.

Then, for example, in a radar apparatus manufacturer, data expressing a correlative relation between the back face 1B of the chassis 1 and antenna axis AX is printed on the seal 9. This seal 9 is stuck on the chassis 1 of the radar apparatus 10. Then, the radar apparatus 10 is shipped.

After the completion of the first to the fourth step described above, as shown in FIG. 5E, for example, in a vehicle manufacturer, the fifth step is conducted in which the bracket 4, to which the radar apparatus 10 is attached, is fixed to the vehicle 50. When the bracket 4 is fixed to a predetermined position of the vehicle 50, the sixth step is conducted in which a correlative positional relation between vehicle axis VX detected in the third step and line BL passing on the front face plate 41 of the bracket 4 is detected.

The reason why the above correlative positional detection is conducted is described as follows. Since the bracket 4 is attached to the vehicle 50 in the after-process, an error is caused between the vehicle 50 and the bracket 4 when the bracket 4 is attached to the vehicle 50.

By the first to the sixth step described above, the correlative positional relation between antenna axis AX and reference line RL perpendicular to the chassis 1 and the correlative positional relation (positional relation between the above two) between reference line RL passing on the chassis 1 and line BL passing on the front face plate 41 of the bracket 4 can be confirmed by the data printed on the seal 9 that is previously stuck in the chassis 1. Further, the correlative positional relation between line BL passing on the front face plate 41 of the bracket 4 and vehicle axis VX can be detected. Therefore, in the seventh step, antenna axis AX is adjusted by utilizing the above positional relations. Specifically, the adjustment is made as follows. First, according to the correlative positional relation between vehicle axis VX and line BL passing on the front face plate 41 of the bracket 4 and also according to the correlative positional relation between reference line RL passing on the chassis 1 and line BL passing on the front face plate 41 of the bracket 4, the bolts 5a to 5d of the bracket 4 are adjusted, and reference line RL passing on the chassis 1 is adjusted so that it can be perpendicular to vehicle axis VX. Then, according to the correlative positional relation between antenna axis AX and reference line RL passing on the chassis 1, the bolts 5a to 5d of the bracket 4 are adjusted again. In this way, antenna axis AX can be adjusted to be parallel with vehicle axis VX.

In the second embodiment described above, it can be estimated that an error is caused between the vehicle 50 and the bracket 4 when the bracket 4 is attached to the vehicle 50. Therefore, after the radar apparatus 10 has once attached to the vehicle 50, parallelism of antenna axis AX is adjusted by utilizing the bolts 5a to 5d. All the attaching and adjusting process of the radar apparatus 10 including the adjustment of antenna axis AX may be conducted on either the radar apparatus manufacturer side or the vehicle manufacturer side.

FIGS. 6A to 6E are views for explaining the third embodiment of the method of adjusting the antenna axis of the radar apparatus 10 of the present invention. The adjusting method of the third embodiment is executed in the case where the chassis 1 of the radar apparatus 10 is attached to the vehicle 50 by using another bracket 4A different from the bracket 4 explained in FIG. 4.

Figure 6A:
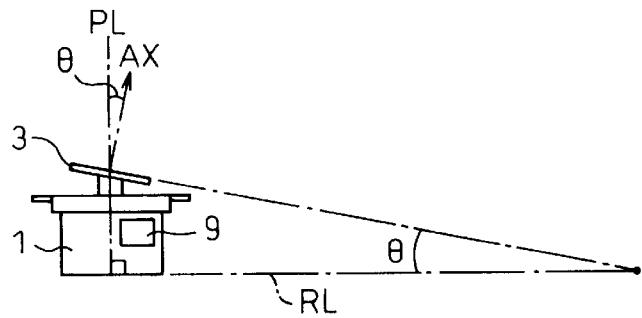
FIG. 6A is a view for explaining the first step of the antenna axis adjusting method of the third embodiment of the radar apparatus of the present invention.
Figures 6B, 6D:
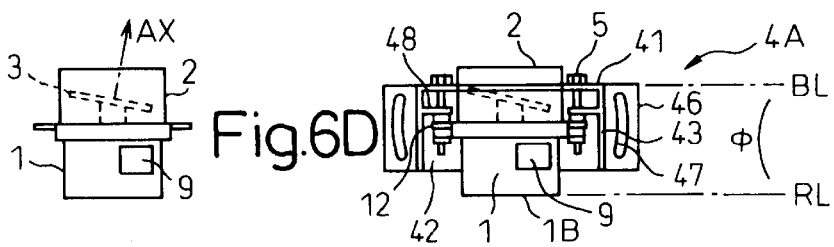
FIG. 6B is a view for explaining the second step of the antenna axis adjusting method of the third embodiment of the radar apparatus of the present invention.
FIG. 6D is a view showing a step in which a chassis of the radar apparatus of the antenna axis adjusting method of the third embodiment of the radar apparatus of the present invention is fixed to a bracket.
Figure 6C:
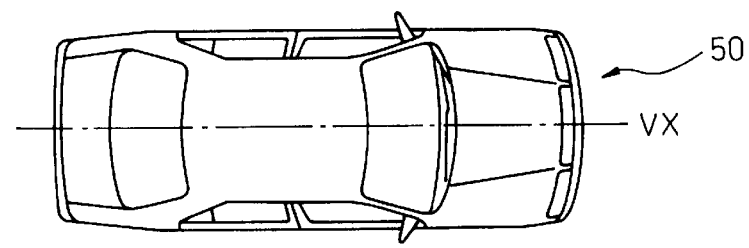
FIG. 6C is a view for explaining the third step of the antenna axis adjusting method of the third embodiment of the radar apparatus of the present invention.

The first to the third step shown in FIGS. 6A to 6C of the method of adjusting the antenna axis of the radar apparatus 10 of the third embodiment are completely the same as those of the method of adjusting the antenna axis of the radar apparatus 10 of the first embodiment explained referring to FIGS. 3A to 3C. Therefore, like reference characters are used to indicate like parts in the views of FIGS. 3A to 3C and the views of FIGS. 6A to 6C which explain the first to the third step of the method of adjusting the antenna axis of the radar apparatus 10 of the third embodiment. Therefore, the explanations are omitted here.

As shown in FIG. 6D, the bracket 4A used for the third embodiment includes: a front face plate 41 having an opening section; an attaching plate 42; and a side plate 43. The attaching plate 42 is provided with an extending section 46 which are extended on both sides of the side plate 43. The attaching hole 47 is formed in this extending section 46. The attaching hole 47 is formed into a concentric circle made round the center of the bracket 4A. Due to the above structure, when the bracket 4A is temporarily fixed to the vehicle side with screws or bolts, it can be turned round the center of the bracket 4A in a predetermined angular range. Inside the side plate 43, there is provided a fixing arm 48 for fixing the attaching piece 12 of the chassis 1.

In the process of fixing the chassis 1 to the bracket 4A, the chassis 1 is fixed to the fixing arm 48, which protrudes from the side plate 43 of the bracket 4A, by using the bolt 5, a washer and a nut. In this state, a correlative positional relation between one portion of the chassis 1 and one portion of the bracket 4A is detected. In the embodiment shown in FIG. 6D, in the same manner as that of the first and the second embodiment, one portion of the chassis 1 is the back face 1B of the chassis 1, and one portion of the bracket 4A is the front face plate 41 of the bracket 4A. In this embodiment, angle $\phi$ formed between the back face 1B of the chassis 1 and the front face plate 41 of the bracket 4A is detected. For example, angle $\phi$ formed between reference line RL passing on the back face 1B of the chassis 1 explained in FIG. 3A and line BL, on which a plane perpendicular to reference line RL crosses the front face plate 41, is detected.

In the same manner as that of the second embodiment, a radar apparatus manufacturer ships the radar apparatus 10 in which the seal 9, on which the data expressing the correlative relation between back face 1B of the chassis 1 and antenna axis AX is printed, is stuck on the chassis 1.

Figure 6E:
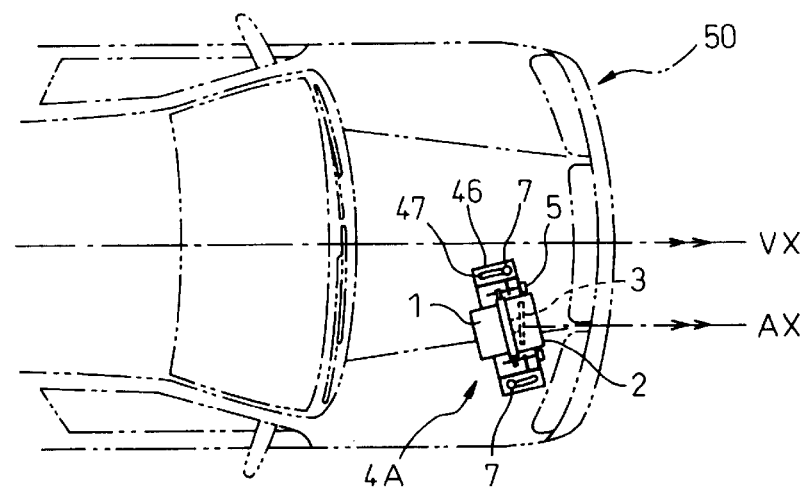
FIG. 6E is a view for explaining a fixing step in which the bracket is fixed to a vehicle in the antenna axis adjusting method of the third embodiment of the radar apparatus of the present invention.

After the fixing step in which the chassis 1 is fixed to the bracket 4A is completed as described above, for example, in the vehicle manufacturer, as shown in FIG. 6E, the fixing step for fixing the bracket 4A to the vehicle 50 is conducted, in which the bracket 4A, to which the radar apparatus 10 is attached, is fixed to the vehicle 50. In the fixing step of the bracket 4A, the bracket 4A is temporarily fixed at a predetermined position of the vehicle 50 with the bolts 7. In this state, the correlative positional relation between vehicle axis VX detected in the third step and line BL perpendicular to the front face plate 41 of the bracket 4 is detected.

In the state in which the bracket 4A is temporarily fixed, the correlative positional relation between antenna axis AX and reference line RL passing on the chassis 1, the correlative positional relation between reference line RL passing on the chassis 1 and line BL passing on the front face plate 41 of the bracket 4 and the correlative positional relation between line BL passing on the front face plate 41 of the bracket 4 and vehicle axis VX are already known. That is, an inclination angle of the front face plate 41 of the bracket with respect to vehicle axis VX, which is necessary to make vehicle axis VX and antenna axis AX parallel with each other, is already known. Therefore, according to the positional relation, while the bracket 4A is being turned in the temporarily fixed state, an inclination of the front face plate 41 of the bracket 4A with respect to vehicle axis VX is detected, and antenna axis AX is adjusted.

Specifically, in the state in which the chassis 1 is attached to the bracket 4A, from the correlative positional relation between antenna axis AX and reference line RL passing on the chassis 1 and from the correlative positional relation between reference line RL passing on the chassis 1 and line BL passing on the front face plate 41 of the bracket 4 and from the correlative positional relation between line BL perpendicular to the front face plate 41 of the bracket 4 and vehicle axis VX, data of an inclination angle of the front face plate 41 of the bracket with respect to vehicle axis VX, which is necessary for making vehicle axis VX and antenna axis AX parallel with each other, is previously calculated. This data is printed, for example, on the seal 9 that is stuck on the radar apparatus 10 so that a third person can recognize it. Therefore, in the step in which the bracket 4A is attached to the vehicle 50, when a worker fixes the bracket 4A to the vehicle 50 so that the data is satisfied, antenna axis AX can be adjusted to be parallel with vehicle axis VX.

All the attaching and adjusting process of the radar apparatus 10 including the adjustment of antenna axis AX may be conducted on either the radar apparatus manufacturer side or the vehicle manufacturer side.

Figure 7A:
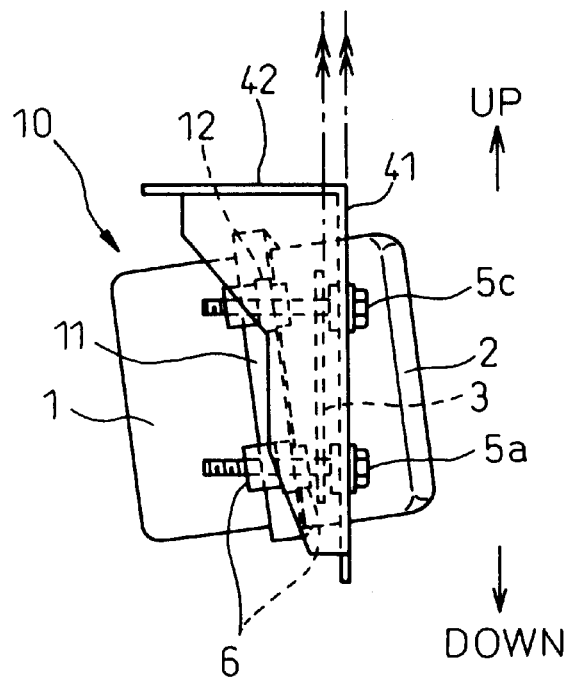
FIG. 7A is a side view showing a state in which the antenna face becomes parallel with the front face plate of the bracket in the antenna axis adjusting method of the fourth embodiment in which the bracket shown in FIG. 4A is used in the radar apparatus of the present invention.
Figure 7B:
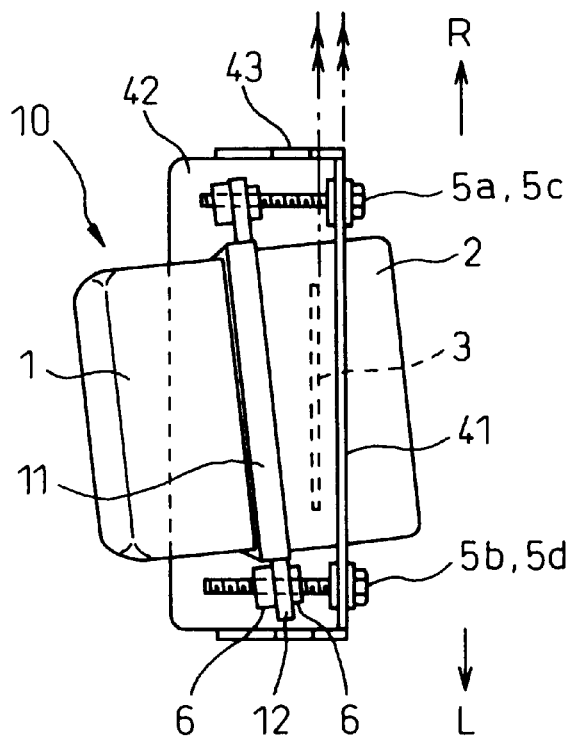
FIG. 7B is a plan view showing a state in which the antenna face becomes parallel with the front face plate of the bracket in the antenna axis adjusting method of the fourth embodiment in which the bracket shown in FIG. 4A is used in the radar apparatus of the present invention.

FIGS. 7A and 7B are views for explaining the fourth embodiment of the method of adjusting the antenna axis of the radar apparatus 10 of the present invention. The adjusting method of the fourth embodiment is executed in the case where the chassis 1 of the radar apparatus 10 is attached to the vehicle 50 by using the bracket 4 explained in FIG. 4.

According to the method of adjusting the antenna axis of the radar apparatus 10 of the fourth embodiment, all the first to the fourth step shown in FIGS. 5A to 5D of the second embodiment described before are executed in the completely same manner. Therefore, the first to the fourth step of the fourth embodiment of the method of adjusting the antenna axis of the radar apparatus 10 are omitted in the views and explanations here.

In the fourth embodiment, after the fourth step in the second embodiment shown in FIG. 5D is completed, that is, after the chassis 1 is attached to the bracket 4 with the bolts 5, the fifth step is executed in which an adjustment is made under the condition that the chassis 1 is attached to the bracket 4 with the bolts 5a to 5d explained in FIG. 4 so that the electric wave transmitting and receiving face of the antenna 3 can become parallel with the front face plate 41. In other words, in the fifth step, the bolts 5a to 5d are adjusted so that antenna axis AX of the antenna 3 becomes perpendicular to the front face plate 41 of the bracket 4. For example, this adjustment can be made by a radar apparatus manufacturer according to the data described on the seal 9 stuck to the chassis 1.

After this fifth step is completed, as shown in FIGS. 7A to 7B, the face of the antenna 3 becomes parallel with the front face plate 41 of the bracket 4, and antenna axis AX of the antenna 3 becomes perpendicular to the front face plate 41 of the bracket 4.

As described above, concerning the radar apparatus 10 of the fourth embodiment in which the first to the fifth step have been completed, the antenna axis AX can be adjusted to be parallel with the vehicle axis VX detected in the third step only when the front face plate 41 of the bracket 4 is attached to the vehicle 50 so that the front face plate 41 can be perpendicular to vehicle axis VX of the vehicle 50 when the bracket 4 to which the radar apparatus 10 is attached is fixed to the vehicle 50. All the attaching and adjusting process of the radar apparatus 10 including the adjustment of antenna axis AX may be conducted on either the radar apparatus manufacturer side or the vehicle manufacturer side.

Figure 8A:
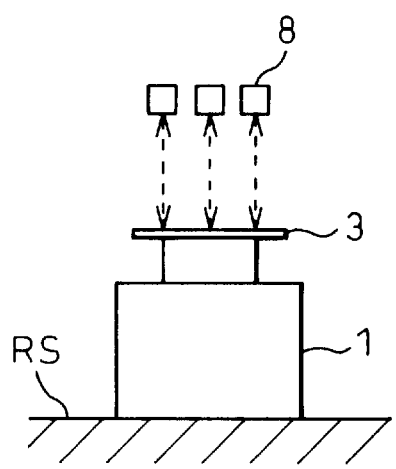
FIG. 8A is a schematic illustration showing a measuring method of detecting a correlative positional relation between the antenna axis and one portion of the chassis while the chassis is being fixed to a reference surface in the case where the antenna axis is fixed with respect to the chassis of the radar apparatus of the present invention.
Figure 8B:
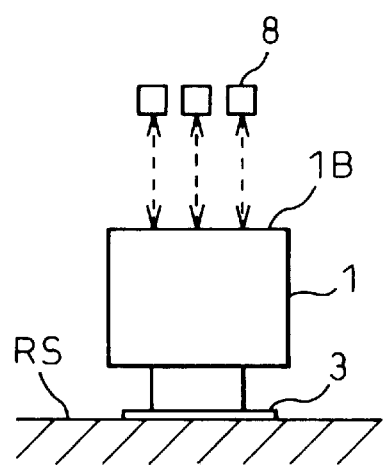
FIG. 8B is a schematic illustration showing a measuring method of detecting a correlative positional relation between the antenna axis and one portion of the chassis while the antenna is being fixed to a reference surface in the case where the antenna axis is fixed with respect to the chassis of the radar apparatus of the present invention.

FIGS. 8A and 8B are views showing a method of detecting a correlative positional relation between the antenna shaft (antenna 3) and the back face 1B of the chassis 1 in the case where the antenna 3 is fixed with respect to the chassis 1 of the radar apparatus 10 so that the antenna axis is not moved. FIG. 8A is a view showing a method of measurement in the case where the chassis 1 is fixed to reference surface RS, and FIG. 8B is a view showing a method of measurement in the case where the antenna 3 is fixed to reference surface RS.

According to the method of measurement shown in FIG. 8A, when the height of the antenna 3 from reference surface RS is measured at least at three arbitrary points with the non-contact type displacement sensor 3, a correlative positional relation between the antenna 3 and the back face 1B of the chassis 1 is detected. According to the method of measurement shown in FIG. 8B, when the height of the back face 1B of the chassis 1 from reference surface RS is measured at least at three arbitrary points with the non-contact type displacement sensor 3, a correlative positional relation between the antenna 3 and the back face 1B of the chassis 1 is detected. When the height of the measurement face from reference surface RS is measured at least at three points as described above, it is possible to find the attaching angle of the face in the directions of X and Y.

Figure 9A:
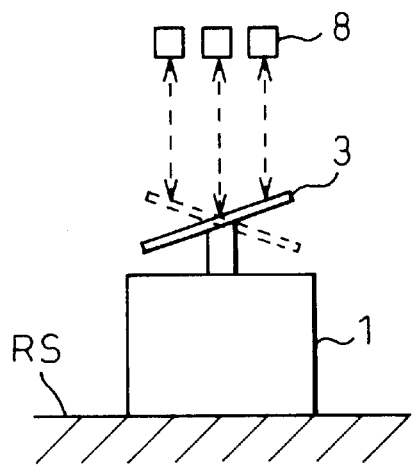
FIG. 9A is a schematic illustration showing a measuring method of detecting a correlative positional relation between the antenna axis and one portion of the chassis while the chassis is being fixed to a reference surface in the case where the antenna axis is movable with respect to the chassis of the radar apparatus of the present invention.
Figure 9B:
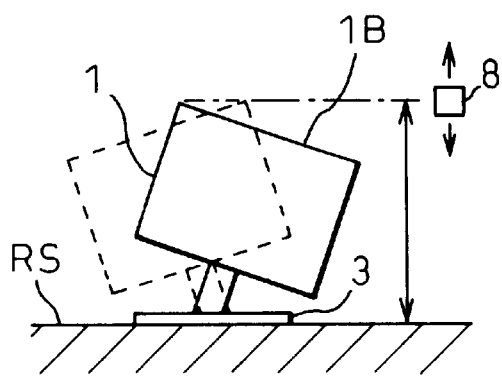
FIG. 9B is a schematic illustration showing a measuring method of detecting a correlative positional relation between the antenna axis and one portion of the chassis while the antenna is being fixed to a reference surface in the case where the antenna axis is movable with respect to the chassis of the radar apparatus of the present invention.
Figure 9C:
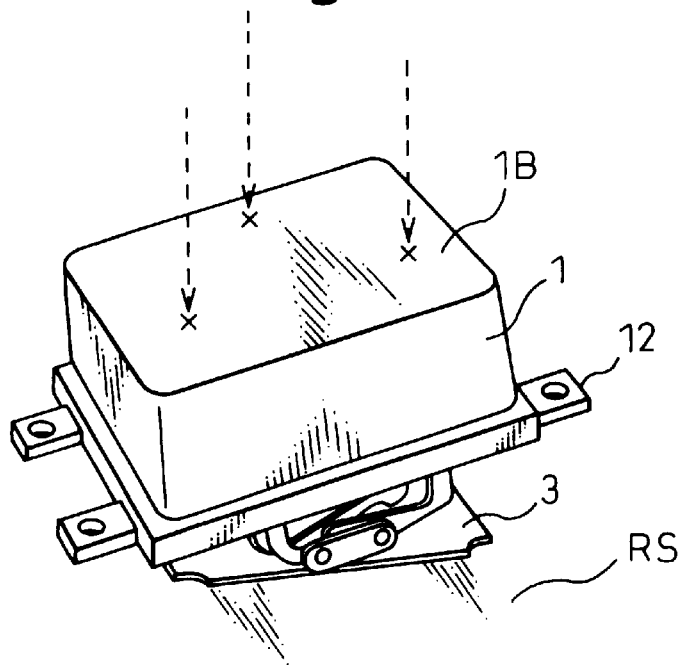
FIG. 9C is a schematic illustration showing a method of detecting a correlative positional relation between the antenna axis and one portion of the chassis by measuring three points on a reverse face of the chassis so as to detect an inclination of the reverse face with respect to the reference surface while the reverse face of the chassis of the radar apparatus is used as one portion in the case where the antenna axis is movable with respect to the chassis of the radar apparatus of the present invention.

FIGS. 9A to 9C are views showing a method of detecting a correlative positional relation between the antenna axis (antenna 3) and the back face 1B of the chassis 1 in the case where the antenna 3 can be oscillated with respect to the chassis 1 of the radar apparatus 10. FIG. 9A shows a method of measurement in the case where the chassis 1 is fixed to reference surface RS, and FIG. 9B shows a method of measurement in the case where the antenna 3 is fixed to reference surface RS. FIG. 9C is a schematic illustration for explaining a case in which the height of three points on the back face 1B of the chassis 1 from reference surface RS is measured in the case where the antenna 3 is fixed to reference surface RS.

In the case shown in FIG. 9A, a correlative positional relation between the antenna 3 and the back face 1B of the chassis 1 is detected as follows. Under the condition that the chassis 1 is fixed to the reference surface RS, the antenna 3 is oscillated right and left to the maximum (in the range from the position indicated by the solid line to the position indicated by the broken line). Then, the height of the antenna 3 from reference surface RS at the position indicated by the solid line and the height of the antenna 3 from reference surface RS at the position indicated by the broken line are measured by the non-contact type displacement sensor 8 at least at three arbitrary points. In this way, the correlative positional relation between the antenna 3 and the back face 1B of the chassis 1 can be detected. On the contrary, under the condition that the antenna 3 is fixed to reference surface RS, as shown in FIG. 9B, the correlative positional relation between the antenna 3 and the back face 1B of the chassis 1 is detected as follows. Under the condition that the antenna 3 is fixed to reference surface RS, the antenna 3 is oscillated right and left to the maximum (in the range from the position indicated by the solid line to the position indicated by the broken line shown in FIG. 9B). Then, the height of the back face 1B of the chassis 1 from reference surface RS at the position indicated by the solid line and the height of the back face 1B of the chassis 1 from reference surface RS at the position indicated by the broken line are measured by the non-contact type displacement sensor 8 at least at three arbitrary points. In this way, the correlative positional relation between the antenna 3 and the back face 1B of the chassis 1 can be detected.

In this connection, instead of the method in which the height of the antenna 3 from reference surface RS is measured at three or more points or the height of the back face 1B of the chassis 1 is measured at three or more points, as shown in FIG. 9B, even when the peak value of the height of the back face 1B of the chassis 1 from reference surface RS is measured with the non-contact type displacement sensor 8 or the peak value of the height of the end portion of the antenna 3 is measured with the non-contact type displacement sensor 8, it is possible to detect correlative positional relation between the antenna 3 and the back face 1B of the chassis 1. The reason why the above method is adopted is that an angle of antenna axis AX can be calculated by the difference of the height of the measurement face from reference surface RS.

In this connection, even in the case where the antenna 3 can be oscillated with respect to the chassis 1 of the radar apparatus 10, when an encoder capable of determining an angle of the antenna 3 by detecting the directional angle of the antenna 3 is built in the drive mechanism of the antenna 3 provided in the chassis 1, by stopping the angle of the antenna 3 at 0° by using the encoder, a correlative positional relation between the antenna 3 and the back face 1B of the chassis 1 can be detected by the same method as that of the radar apparatus 10 in which the antenna 3 is fixed.

FIGS. 10A and 10B are views showing a method of detecting a correlative positional relation between the back face 1B of the chassis 1 and the front face plate 41 of the bracket 4B in the case where the chassis 1 of the radar apparatus 10 is attached to a vehicle through the bracket 4B. FIG. 10A is a view showing a measuring method in which the bracket 1B is fixed to reference surface RS, and FIG. 10B is a view showing a measuring method in which the back face 1B of the chassis 1 is fixed to reference surface RS.

According to the measuring method shown in FIG. 10A, a correlative positional relation between the surface of the front face plate 41 of the bracket 4B and the back face 1B of the chassis 1 is detected in such a manner that the height of the back face 1B of the chassis 1 from reference surface RS is measured with the non-contact type displacement sensor 8 at least at three arbitrary points under the condition that the bracket 4B to which the chassis 1 is attached is fixed onto reference surface RS. On the contrary, according to the measuring method shown in FIG. 10B, a correlative positional relation between the back face 1B of the chassis 1 and the bracket 4B can be detected when the height of the back face of the bracket 4B from reference surface RS is measured with the non-contact type displacement sensor 8 at least at three arbitrary points under the condition that the back face 1B of the chassis 1 is fixed to reference surface RS.

As the non-contact type displacement sensor 8 explained above, a laser-beam-type angle sensor can be used. In the case of using this laser-beam-type angle sensor, the back face 1B of the chassis 1 and the face of the bracket 4, 4A, 4B, which is placed on reference face RS, may be finished to a surface, the surface roughness of which is substantially the same as that of reference surface RS. In order to conduct the above measurement easily, marks may be attached to the three measuring points described before.

FIG. 11 is a view for explaining a method in which a correlative positional relation between the front face plate 41 of the bracket 1 and vehicle axis VX is detected with the non-contact type displacement sensor 8 in the case of attaching the radar apparatus 10 to the vehicle through the bracket 4. The non-contact type displacement sensor 8 of this embodiment includes a sensor body 8B to which at least three detection heads 8A are attached. At the center of this sensor body 8B, there is provided a level 8C for setting the sensor body 8B perpendicular to a predetermined axis.

A correlative positional relation between the bracket 4 of the radar apparatus 10, which is mounted on a vehicle, and vehicle axis VX is detected with this non-contact type displacement sensor 8 as follows. First, the sensor body 8B is set to be perpendicular to vehicle axis VX by using the level 8C. In the above state, a laser beam emerges from the detecting head 8A. When reflected light reflected on the front face plate 41 of the bracket 4 is received, an inclination between the sensor body 8B and the bracket 4 can be detected. Therefore, the correlative positional relation between the bracket 4 of the radar apparatus 10, which is mounted on a vehicle, and vehicle axis VX can be detected.

Figure 12:
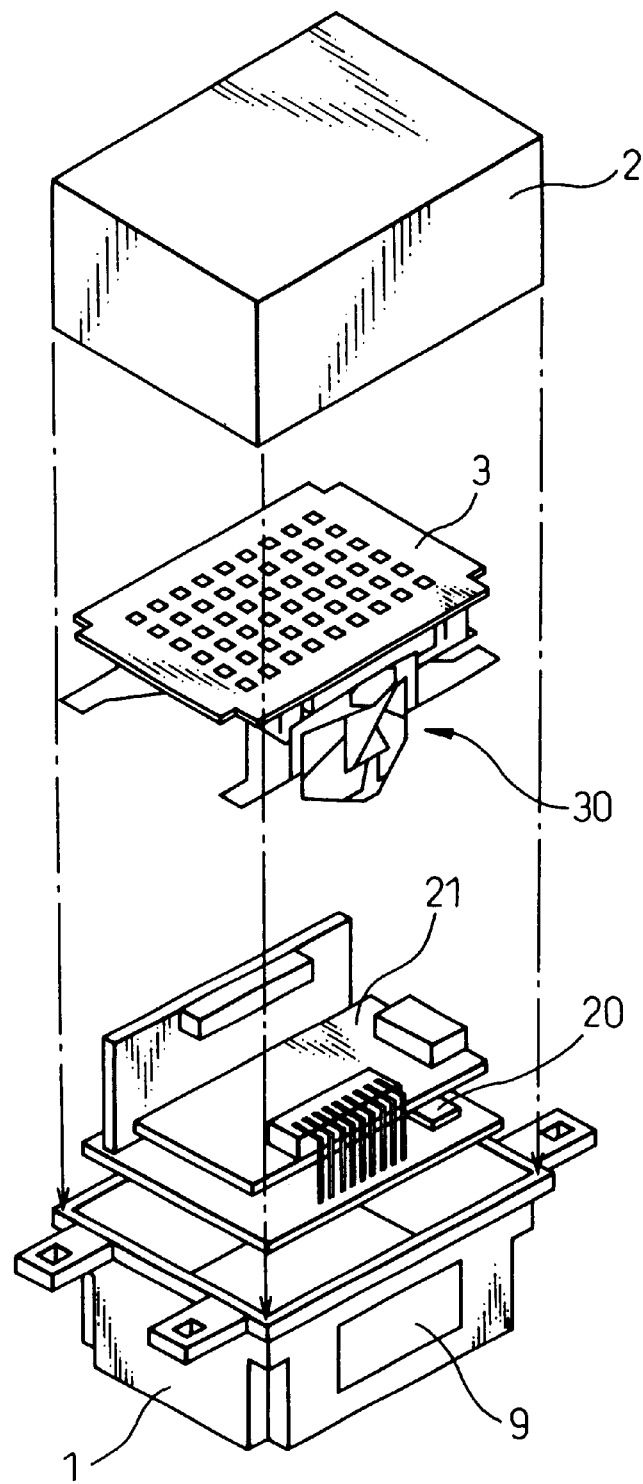
FIG. 12 is an exploded perspective view of the radar apparatus showing a position of the seal, on which data for adjusting the antenna axis is described, stuck to the chassis of the radar apparatus of the present invention and also showing a position of the internal memory, which is built in the chassis, in which data for adjusting the antenna axis is stored.

FIG. 12 is a view showing a state in which the seal 9 is stuck to the chassis 1. On the seal 9, data of the thus measured correlative positional relation between the back face 1B of the chassis 1 and the antenna 3 is described so that the data can be shown to a third person. In this connection, when the chassis 1 is attached to the vehicle by using the bracket 4, this seal 9 may be stuck to not the chassis 1 but the bracket 4. Alternatively, this seal 9 may be stuck to both the chassis 1 and the bracket 4. When the radar apparatus 10 is attached to the vehicle by a worker, the worker can conduct an adjusting work of adjusting the antenna axis while reading the data described on the seal 9.

In this connection, various data may be described on this seal 9. For example, the correlative positions between the antenna axis and the bracket, which can be obtained from the correlative positional relation between the front face plate 41 and the back face 1B of the chassis 1 and the correlative positional relation between the back face 1B of the chassis 1 and antenna 3, may be described on the seal 9. Instead of sticking the seal 9 to the chassis 1, this seal 9 may be stuck to a box, in which the radar apparatus 10 is accommodated when it is shipped, together with the product number.

Data may be described on the seal 9 in such a manner that, for example, the number and direction of revolutions of each adjusting bolt may be visibly indicated on the seal 9. Alternatively, the number and direction of revolutions of each adjusting bolt may be indicated in the form of bar codes. The bar codes are read out by a bar code scanner. According to the data that is read out by the bar code scanner, the chassis and bracket are driven by an attaching jig having an automatic turning mechanism for turning the adjusting bolt and by an adjusting device for adjusting an inclination correction so that the antenna axis can be automatically adjusted in the vehicle. Alternatively, the antenna axis can be automatically adjusted by a drive mechanism for directly driving the antenna. Except for the method in which the data is described on the seal 9, the following method can be adopted. The data is stored in the internal memory 20 mounted on the control base plate 21 provided inside the chassis 1. The data is read out by an attaching jig having an automatic turning mechanism for automatically turning the adjusting bolt or by an adjusting device for adjusting an inclination correction, and the chassis and bracket are driven. The antenna axis is automatically adjusted on a vehicle. Alternatively, the antenna axis is automatically adjusted by a drive device in which the antenna is directly driven. It is possible to provide an indication device for indicating data of an inclination correction which is read out from the internal memory 20 or the bar codes printed on the seal 9.

Figure 13:
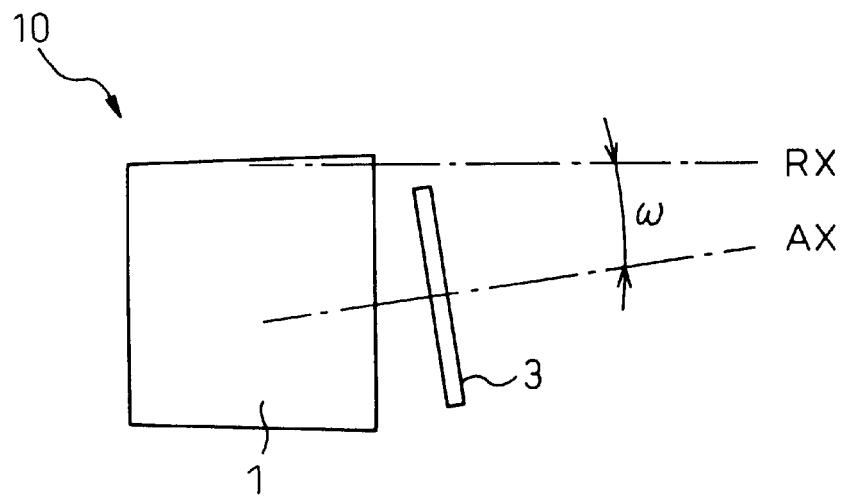
FIG. 13 is a view showing a method of detecting an inclination angle of the antenna axis with respect to the reference axis of the radar apparatus of the present invention.

Except for the methods explained above, it is possible to adopt the following method. As shown in FIG. 13, in the assembling process of the radar apparatus 10, radar reference axis RX, which is a reference axis capable of being measured from the outside dimension of the radar apparatus 10, is detected as one portion of the chassis 1, and an angle formed between this radar reference axis RX and antenna axis AX is detected as an antenna inclination angle ω. When the radar apparatus 10 is attached to the vehicle, antenna axis AX is adjusted by using the thus obtained data.

Figure 14:
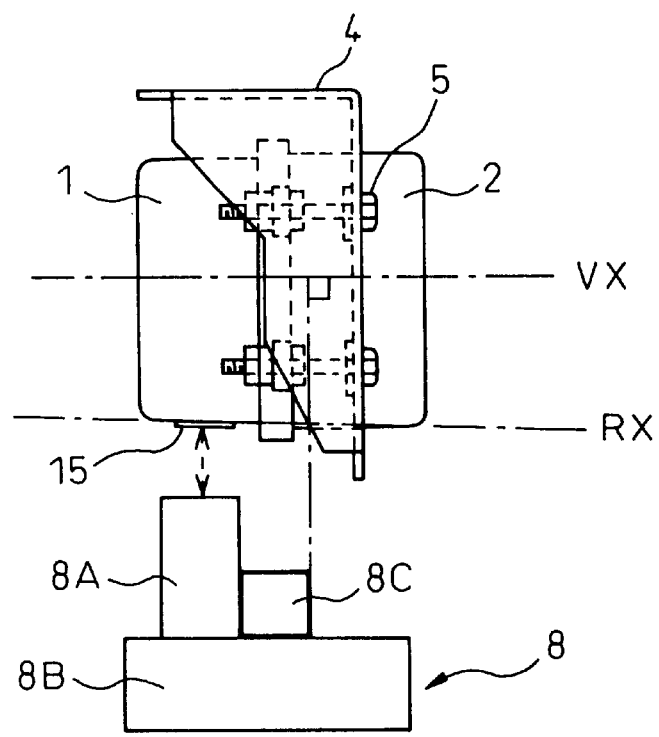
FIG. 14 is a schematic illustration showing a method of measuring a difference between the vehicle axis and the radar reference axis when a reflecting section for the non-contact type displacement sensor is provided on a side of the chassis of the radar apparatus of the present invention.

Further, as shown in FIG. 14, the reflecting section 15 used for the non-contact type displacement sensor 8 to measure a difference between vehicle axis VX and radar reference axis RX may be arranged on the side of the chassis 1 of the radar apparatus 10. This reflecting section 15 may be a reflecting plate, a mirror face section or a polished section. In this connection, in order to recognize the reflecting section 15 easily, a mark may be attached to the reflecting section. In the case in which the reflecting section 15 is arranged in the chassis 1, the main body 8B of the non-contact type displacement sensor 8 is set parallel with vehicle axis VX by using the level 8C, and then the non-contact type displacement sensor 8 is moved parallel with vehicle axis VX. Then, an inclination between radar reference axis RX and vehicle axis VX can be read out.

After the inclination between radar reference axis RX and vehicle axis VX is known, as the inclination angle ω between radar axis RX and antenna axis AX has already been detected as explained in FIG. 13, the inclination between vehicle axis VX and antenna axis AX is adjusted so that the axes can be parallel with each other by utilizing these relations.

In this connection, the reflecting section 15 may be provided on a predetermined face of the bracket. Further, data of the inclination angle ω formed between radar axis RX and antenna axis AX may be printed on the seal 9 and the thus printed seal 9 may be stuck to the chassis 1. Alternatively, data of the inclination angle ω formed between radar axis RX and antenna axis AX may be stored in the internal memory 20.

What is claimed is:

1. A radar apparatus in which the direction of the antenna is recognizable from outside, comprising:

a chassis having a space inside capable of accommodating at least an antenna;

an antenna incorporated into the chassis;

a cover for covering the antenna, attached to the chassis; and a recognition member in which a measured value expressing a correlative positional relation between the antenna axis of the antenna and one portion of the chassis is recorded, the measured value having been measured before the chassis is covered with the cover, the measured value capable of being recognized from outside the radar apparatus.

2. A radar apparatus according to claim 1, wherein the recognition member is a seal stuck to an outer face of the radar apparatus so as to indicate the measured value.

3. A radar apparatus according to claim 1, wherein the recognition member is an internal memory for storing the measured value, mounted in the radar apparatus.

4. A radar apparatus according to claim 1, further comprising a bracket used for attaching the radar apparatus, wherein at least one of the measured value of the correlative positional relation between the antenna axis and one portion of the chassis, the measured value of the correlative positional relation between the antenna axis and one portion of the bracket and the measured value of the correlative positional relation between one portion of the chassis and one portion of the bracket is recorded in the recognition member.

5. A radar apparatus according to claim 4, wherein the recognition member is a seal for indicating the measured value, stuck onto an outer face of the radar apparatus.

6. A radar apparatus according to claim 4, wherein the recognition member is an internal memory for storing the measured value, mounted in the radar apparatus.

7. A radar apparatus according to claim 1, wherein the antenna axis is fixed with respect to the chassis, one of the antenna face and one portion of the chassis is fixed to a reference surface, the height of one portion of the chassis from the reference surface is measured at least at three arbitrary points when the antenna face is fixed to the reference surface, the height of the antenna face from the reference surface is measured at least at three arbitrary points when one portion of the chassis is fixed to the reference surface, and a correlative positional relation between the antenna axis and one portion of the chassis is detected from thus measured values.

8. A radar apparatus according to claim 4, wherein the antenna axis is fixed with respect to the chassis, one of the antenna face and one portion of the chassis is fixed to a reference surface, the height of one portion of the chassis from the reference surface is measured at least at three arbitrary points when the antenna face is fixed to the reference surface, the height of the antenna face from the reference surface is measured at least at three arbitrary points when one portion of the chassis is fixed to the reference surface, and a correlative positional relation between the antenna axis and one portion of the chassis is detected from the thus measured values.

9. A radar apparatus according to claim 1, wherein the antenna axis is movable with respect to the chassis, one of the antenna face and one portion of the chassis is fixed to a reference surface, when the antenna face is fixed to the reference surface, the height of one portion of the chassis from the reference surface in the case of moving the antenna face right and left to the maximum is measured at the respective position at least at three arbitrary points, when one portion of the chassis is fixed to the reference surface, the height of the antenna face from the reference surface in the case of moving the antenna face right and left to the maximum is measured at the respective position at least at three arbitrary points, and a correlative positional relation between the antenna axis and one portion of the chassis is detected from the thus measured values by an angle between the antenna face and the reference surface.

10. A radar apparatus according to claim 4, wherein the antenna axis is movable with respect to the chassis, one of the antenna face and one portion of the chassis is fixed to a reference surface, when the antenna face is fixed to the reference surface, the height of one portion of the chassis from the reference surface in the case of moving the antenna face right and left to the maximum is measured at the respective position at least at three arbitrary points, when one portion of the chassis is fixed to the reference surface, the height of the antenna face from the reference surface in the case of moving the antenna face right and left to the maximum is measured at the respective position at least at three arbitrary points, and a correlative positional relation between the antenna axis and one portion of the chassis is detected from the thus measured values by an angle between the antenna face and the reference surface.

11. A radar apparatus according to claim 1, wherein the antenna axis is movable with respect to the chassis, one of the antenna face and one portion of the chassis is fixed to a reference surface, when the antenna face is fixed to the reference surface, a peak value of height of one portion of the chassis from the reference surface in the case of moving the antenna face right and left to the maximum is measured at the respective position, when one portion of the chassis is fixed to the reference surface, a peak value of height of the antenna face from the reference surface in the case of moving the antenna face right and left to the maximum is measured at the respective position, and a correlative positional relation between the antenna axis and one portion of the chassis is detected from the thus measured values by an angle between the antenna face and the reference surface.

12. A radar apparatus according to claim 4, wherein the antenna axis is movable with respect to the chassis, one of the antenna face and one portion of the chassis is fixed to a reference surface, when the antenna face is fixed to the reference surface, a peak value of the height of one portion of the chassis from the reference surface in the case of moving the antenna face right and left to the maximum is measured at the respective position, when one portion of the chassis is fixed to the reference surface, a peak value of the height of the antenna face from the reference surface in the case of moving the antenna face right and left to the maximum is measured at the respective position, and a correlative positional relation between the antenna axis and one portion of the chassis is detected from the thus measured values by an angle between the antenna face and the reference surface.

13. A radar apparatus according to claim 1, wherein the antenna axis is movable with respect to the chassis, an encoder is built in a drive section of the antenna, one of the antenna face and one portion of the chassis is fixed to the reference surface, when the antenna face is fixed to the reference surface, an angle of the antenna face is stopped at the angle 0° by the encoder, and height of one portion of the chassis from the reference surface is measured at least at three arbitrary points, when one portion of the chassis is fixed to the reference surface, an angle of the antenna face is stopped at the angle 0° by the encoder, and height of the antenna face from the reference surface is measured at least at three arbitrary points, and a correlative positional relation between the antenna axis and one portion of the chassis at the angle 0° of the antenna face by the encoder is detected from the measured values.

14. A radar apparatus according to claim 4, wherein the antenna axis is movable with respect to the chassis, an encoder is built in a drive section of the antenna, one of the antenna face and one portion of the chassis is fixed to the reference surface, when the antenna face is fixed to the reference surface, an angle of the antenna face is stopped at the angle 0° by the encoder, and height of one portion of the chassis from the reference surface is measured at least at three arbitrary points, when one portion of the chassis is fixed to the reference surface, an angle of the antenna face is stopped at the angle 0° by the encoder, and height of the antenna face from the reference surface is measured at least at three arbitrary points, and a correlative positional relation between the antenna axis and one portion of the chassis at the angle 0° of the antenna face by the encoder is detected from the measured values.

15. A radar apparatus according to one of claims 7 to 14, wherein a setting face, the surface roughness of which is substantially the same as that of the reference surface, is formed in one portion of the chassis.

16. A radar apparatus according to claim 4, wherein one of the chassis and one portion of the bracket is fixed to the reference surface, when one portion of the chassis is fixed to the reference surface, the height of one portion of the bracket from the reference surface is measured at least at three arbitrary points, when one portion of the bracket is fixed to the reference surface, the height of one portion of the chassis from the reference surface is measured at least at three arbitrary points, and a correlative positional relation between one portion of the chassis and one portion of the bracket is detected from the measured values.

17. A radar apparatus according to claim 16, wherein a setting face, the surface roughness of which is substantially the same as that of the reference surface, is formed on either one portion of the bracket or one portion of the chassis which is fixed to the reference surface.

18. A radar apparatus according to claim 1, wherein one portion of the chassis is a radar reference axis which is a reference axis capable of being measured from the outside dimension of the radar apparatus, and an angle formed between this radar reference axis and the antenna axis is detected as an antenna inclination angle.

19. A radar apparatus in which the direction of the antenna is recognizable from outside, comprising:

a chassis having a space inside capable of accommodating at least an antenna;

an antenna incorporated into the chassis; and a cover for covering the antenna, attached to the chassis, wherein a correlative positional relation between the antenna axis of the antenna incorporated into the chassis and one portion of the chassis is detected and recorded in the first step in the assembling process of the radar apparatus, the chassis into which the antenna is incorporated is covered with the cover in the second step, the car axis of the car to which the radar apparatus is attached is detected in the third step, and a state, in which one portion of the chassis is attached to the vehicle, is adjusted with respect to the vehicle axis and the chassis is fixed to the vehicle so that the antenna axis can become parallel with the vehicle axis in the step of fixing the chassis by utilizing the correlative positional relation between the vehicle axis detected and one portion of the chassis and the correlative positional relation between the vehicle axis and the antenna axis.

20. A radar apparatus in which the direction of the antenna is recognizable from outside, comprising:

a chassis having a space inside capable of accommodating at least an antenna;

an antenna incorporated into the chassis;

a cover for covering the antenna, attached to the chassis; and a bracket to which the chassis is attached, wherein a correlative positional relation between the antenna axis of the antenna incorporated into the chassis and one portion of the chassis is detected and recorded in the first step in the assembling process of the radar apparatus, the chassis into which the antenna is incorporated is covered with the cover in the second step, the axis of the car to which the radar apparatus is attached is detected in the third step, the chassis is attached to the bracket in the fourth step so that a relative position between the chassis and the bracket can be adjusted and a correlative positional relation between one portion of the chassis and one portion of the bracket is detected and recorded in this state, the bracket is fixed to the vehicle in the fifth step, a correlative positional relation between the detected vehicle axis and one portion of the bracket is detected and recorded in the sixth step, and a correlative positional relation between one portion of the bracket and one portion of the chassis is adjusted and the chassis is fixed to the vehicle in the seventh step so that the antenna axis can become parallel with the vehicle axis by utilizing the correlative positional relations, which are recorded, between the vehicle axis and one portion of the bracket, between one portion of the bracket and one portion of the chassis and between one portion of the chassis and the antenna axis.

21. A radar apparatus in which the direction of the antenna is recognizable from outside, comprising:

a chassis having a space inside capable of accommodating at least an antenna;

an antenna incorporated into the chassis; and a cover for covering the antenna, attached to the chassis; and a bracket to which the chassis is attached, wherein a correlative positional relation between the antenna axis of the antenna incorporated into the chassis and one portion of the chassis is detected and recorded in the first step in the assembling process of the radar apparatus, the chassis into which the antenna is incorporated is covered with the cover in the second step, the axis of the car to which the radar apparatus is attached is detected in the third step, the chassis is fixed to the bracket and a correlative positional relation between one portion of the chassis and one portion of the bracket is detected and recorded in the fixing step in which the chassis is fixed to the bracket, and a state in which the bracket is attached to the vehicle is adjusted with respect to the vehicle axis and the bracket is fixed to the vehicle in the fixing step of fixing the bracket to the vehicle so that the antenna axis becomes parallel with the vehicle axis by utilizing the correlative positional relation detected between the vehicle axis and one portion of the bracket and the correlative positional relation detected between the vehicle axis and one portion of the chassis and also the correlative positional relation between the vehicle axis and the antenna axis.

22. A radar apparatus according to claim 20, wherein a detection of the state with respect to the vehicle axis in which one portion of the bracket is attached to the vehicle in the bracket fixing step is made by using a non-contact type displacement sensor provided outside the vehicle.

23. A radar apparatus according to claim 22, wherein the non-contact type displacement sensor is a laser-beam-type angle sensor.

24. A radar apparatus according to claim 21, wherein a detection of the state, with respect to the vehicle axis, in which one portion of the bracket is attached to the vehicle in the bracket fixing step is made by using a non-contact-type displacement sensor provided outside the vehicle.

25. A radar apparatus according to claim 24, wherein the non-contact type displacement sensor is a laser-beam-type angle sensor.

26. A radar apparatus according to claim 19, wherein a correlative positional relation detected between one portion of the chassis and the antenna axis is recorded on a seal, which is stuck on an outer face of the radar apparatus.

27. A radar apparatus according to claim 20, wherein a correlative positional relation between one portion of the bracket detected and the antenna axis is recorded on a seal, which is stuck on an outer face of the radar apparatus.

28. A radar apparatus according to claim 21, wherein a correlative positional relation between one detected portion of the bracket and the antenna axis is recorded on a seal, which is stuck on an outer face of the radar apparatus.

29. A radar apparatus according to claim 19, further comprising an internal memory mounted in the radar apparatus, wherein a correlative positional relation between one portion of the chassis and the antenna axis is stored in the internal memory.

30. A radar apparatus according to claim 20, further comprising an internal memory mounted in the radar apparatus, wherein a correlative positional relation between one portion of the bracket and the antenna axis is stored in the internal memory.

31. A radar apparatus according to claim 21, further comprising an internal memory mounted in the radar apparatus, wherein a correlative positional relation between one portion of the bracket and the antenna axis is stored in the internal memory.

32. A radar apparatus according to claim 19, wherein one portion of the chassis is a radar reference axis capable of being measured from the outside dimension of the radar apparatus, an angle formed between the radar reference axis and the antenna axis is detected as an inclination angle of the antenna, and a reflecting section for a non-contact type displacement sensor, for measuring a difference between the car axis and the radar reference axis, is provided on the chassis.

33. A radar apparatus according to claim 20, wherein one portion of the chassis is a radar reference axis capable of being measured from the outside dimension of the radar apparatus, an angle formed between the radar reference axis and the antenna axis is detected as an inclination angle of the antenna, and a reflecting section for a non-contact type displacement sensor, for measuring a difference between the car axis and the radar reference axis, is provided on the chassis.

34. A radar apparatus according to claim 21, wherein one portion of the chassis is a radar reference axis capable of being measured from the outside dimension of the radar apparatus, an angle formed between the radar reference axis and the antenna axis is detected as an inclination angle of the antenna, and a reflecting section for a non-contact type displacement sensor, for measuring a difference between the car axis and the radar reference axis, is provided on the chassis.

35. A radar apparatus in which the direction of the antenna is recognizable from outside, comprising:

a chassis having a space inside capable of accommodating at least an antenna;

an antenna incorporated into the chassis;

a cover for covering the antenna, attached to the chassis; and a bracket to which the chassis is attached, wherein a correlative positional relation between the antenna axis of the antenna incorporated into the chassis and one portion of the chassis is detected and recorded in the first step in the assembling process of the radar apparatus, the chassis into which the antenna is incorporated is covered with the cover in the second step, the chassis is attached to the bracket in the third step so that a correlative positional relation between them can be adjusted and the correlative positional relation between one portion of the chassis and one portion of the bracket is detected and recorded in this state, a correlative positional relation between the chassis and the bracket is adjusted in the fourth step according to the correlative positional relation detected in the first step between the antenna axis and one portion of the chassis and according to the correlative positional relation detected in the third step between one portion of the chassis and one portion of the bracket, so that the antenna axis becomes perpendicular to the bracket face.

36. A radar apparatus in which the direction of the antenna is recognizable from outside, comprising:

a chassis having a space inside capable of accommodating at least an antenna;

an antenna incorporated into the chassis;

a cover for covering the antenna, attached to the chassis; and a bracket to which the chassis is attached, wherein a correlative positional relation between the antenna axis of the antenna incorporated into the chassis and one portion of the chassis is detected and recorded in the first step in the assembling process of the radar apparatus, the chassis into which the antenna is incorporated is covered with the cover in the second step, and a correlative positional relation between the chassis and the bracket is adjusted in the third step according to the correlative positional relation, detected in the first step, between the antenna axis and one portion of the chassis so that the antenna axis becomes perpendicular to the bracket face.

37. A radar apparatus according to claim 4, wherein the radar apparatus is attached to a vehicle so that the antenna axis becomes parallel with the vehicle axis according to data recorded in the recognition member.

38. A radar apparatus according to claim 4, further comprising a drive mechanism, wherein one of the radar apparatus attached to the vehicle and the antenna of the radar apparatus is driven according to the data recorded in the recognition member so that the antenna axis becomes parallel with the vehicle axis.

39. A method of manufacturing a radar apparatus composed of a chassis, an antenna and a cover, which is attached to the chassis, for covering the antenna, comprising:

a first step for detecting a correlative positional relation between an antenna axis of the antenna incorporated in the chassis and one portion of the chassis; and a second step for covering the chassis, into which the antenna is incorporated, with the cover.

* * * * *